2,859,594

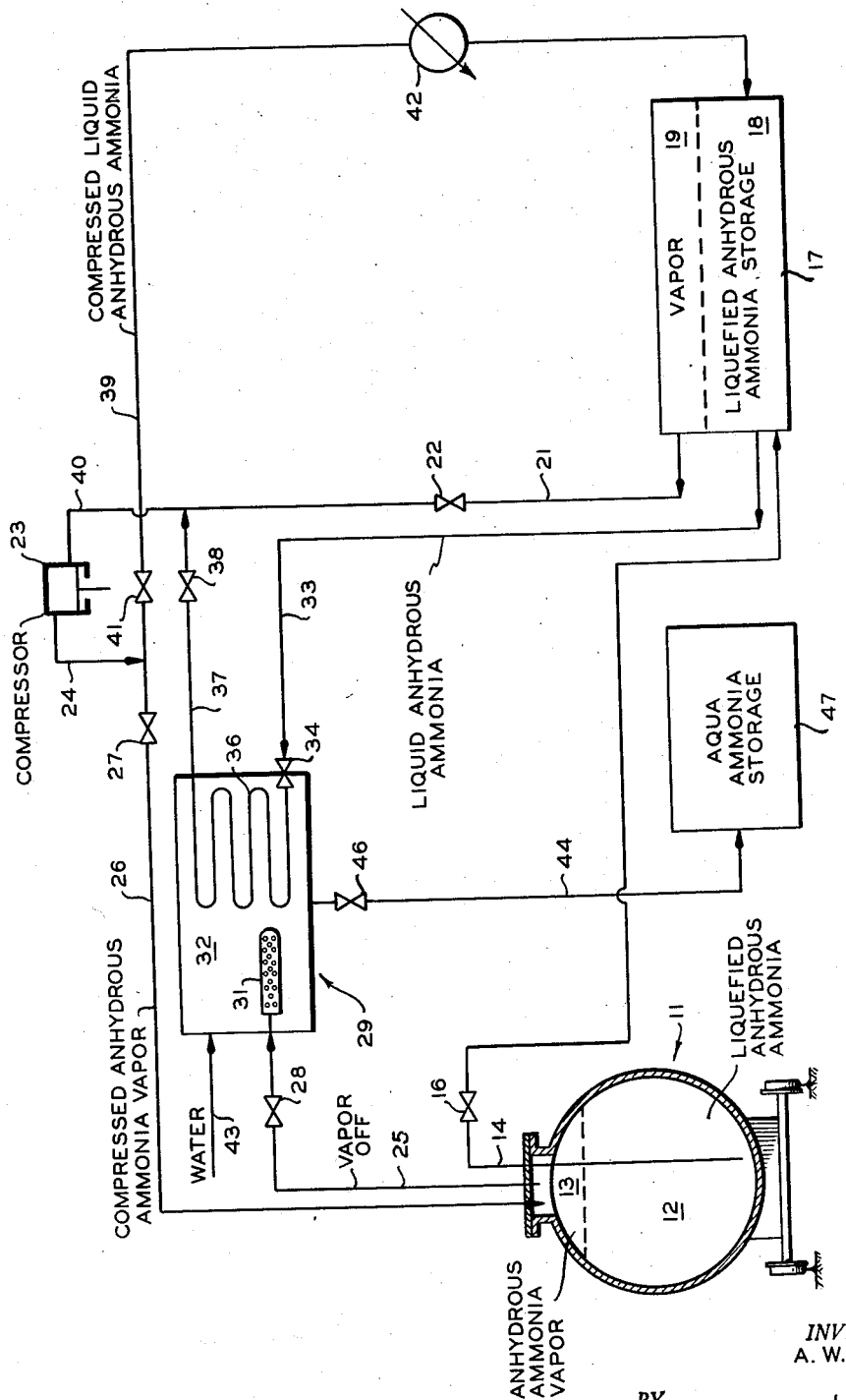

TRANSFER OF VOLATILE LIQUIDS AND RECOVERY OF VAPORS OF SAME

Alvin W. Peck, Bartlesville, Okla., assignor to Phillips Petroleum Company, a corporation of Delaware Application June 28, 1956, Serial No. 594,600

7 Claims. (Cl. 62—50)

This invention relates to the transfer of volatile liquids and the recovery of their vapors. In one aspect it relates to a process and apparatus for transferring highly volatile liquids, such as liquefied gases, from a tank car or similar vessels to storage and the subsequent recovery of residual vapors of the same remaining in the tank car. In particular, it relates to a process and apparatus for transferring liquefied anhydrous ammonia from a tank car or similar vessel to a storage receiver, the recovery of the residual anhydrous ammonia vapors remaining in the tank car, and the subsequent solution of these vapors in water.

The practice of storing and transferring highly volatile liquids, such as liquefied anhydrous ammonia, involves the use of pressure tanks or vessels. In the case of liquefiable gases, such as anhydrous ammonia, it involves their liquefaction and the storage and shipping of the liquefied gases in a liquid condition. The volatile liquids or gases in a liquid condition are generally unloaded from the pressure tank by pumping the liquid directly from the tank to the storage receiver. The empty tank usually contains a substantial amount of residual vapor and represents a valuable product, the recovery of which is desirable. However, the empty tank car is often returned to the supplier with a considerable amount of the residual vapors remaining therein for want of a suitable method for recovering the vapor. In some instances, it is often a common practice to discharge the residual vapors from the tank car to the atmosphere with the resulting loss of valuable material.

The term "highly volatile liquids" as used herein and in the appended claims designates a contained body of liquefied gas or gases normally volatile under atmospheric temperatures and pressures.

Accordingly, it is an object of this invention to provide a process and apparatus for transferring highly volatile liquids from a pressure tank or similar vessel to a storage receiver and the subsequent recovery of residual vapors remaining in the pressure tank. Another object is to effect such transfer and recovery with a minimum expenditure of power and equipment, and a maximum conservation of materials and energy. A further object is to transfer liquefied anhydrous ammonia and its vapor in a practical, efficient and economical manner. A still further object is to provide an economical process and apparatus for transferring liquefied anhydrous ammonia from a tank car to a storage receiver and subsequently recovering residual vapors remaining in the tank car by absorbing the vapors in water and, to that end, employing the refrigerative capacity of the stored liquid anhydrous ammonia. Other objects, and advantages of my invention will become apparent, to those skilled in the art, from the following discussion, appended claims, and accompanying drawing.

In accordance with my invention, there is provided a process and apparatus whereby a highly volatile liquid, such as liquefied anhydrous ammonia, is transferred or emptied from a tank car, or similar vessel, to a closed storage receiver by compressing the vapor evaporated from the liquefied anhydrous ammonia in the storage receiver and forcing the compressed vapor into the tank car in order to displace the liquid contents of the same. The residual anhydrous ammonia vapor remaining in the tank car after the removal of the liquid contents is transferred or emptied under its own vapor pressure to an absorber containing water wherein the vapor is dissolved so as to form aqua ammonia; to this end, the stored liquefied anhydrous ammonia is circulated to the absorber whereby the refrigerative capacity of the liquefied anhydrous ammonia is utilized. The vapor generated by the refrigerative liquid, as a result of the indirect heat exchange with the contents of the absorber, is compressed, reliquefied and the resulting liquid is returned to the storage receiver. In accomplishing the above described transfer and recovery, a single compressor is utilized for the dual purpose of compressing the receiver vapor used to displace the liquid contents of the tank car and for compressing the vapor generated by the indirect heat exchange.

In order to facilitate the understanding of my invention, reference will now be made to the single drawing which is a diagrammatic representation of a system for emptying the contents of a tank car. It is to be emphasized that the drawing is schematic and has been made as simple as possible for purposes of illustration and various appurtenances, such as constant pressure valves, gauging devices, thermometers, sampling lines, safety or pressure relief valves, etc., which have been omitted since their use will be apparent to those skilled in the art upon being acquainted with my invention.

As shown in the drawing, a tank car generally designated 11 has a cylindrical form commonly used for the storage and shipping of highly volatile liquids; any type or form of tank or pressure vessel can be used and the vessel may be encased with suitable insulation. The top of the tank car 11 is closed and the tank car 11 contains a volatile liquid 12, for example, liquefied anhydrous ammonia, with a vapor space 13 thereabove. A conduit 14 extending down through the top of the tank car 11 has its intake end below the liquid level of the liquid 12 near the bottom of the tank car. The conduit 14, having a suitable fluid flow valve 16 therein, leads to a closed storage receiver 17 which contains a stored liquid 18 with a liquid level defining a vapor space 19 thereabove. A conduit 21, having a fluid flow valve 22 therein, communicates at one end with the vapor space 19 and at the other end with a compressor 23. The compressor 23 has an outlet line 24 which communicates with a conduit 26 having a fluid flow valve 27 therein. Conduit 26 extends through the top of the tank car 11 into the vapor space 13. Removal of the liquid contents 12 of the tank car 11 is accomplished by displacing the contents 12 with compressed vapor introduced into the vapor space 13 by conduit 26. The displaced liquid contents are thus transferred by conduit 14 to the bottom of storage receiver 17. The vapor evaporated from the stored liquid contents 18 is conveyed from the vapor space 19 by means of line 21 to the compressor 23. The resulting compressed vapor is conveyed by means of line 24 and conduit 26 to the vapor space 13 of tank car 11. The vapor pressure in the vapor space 13 is maintained substantially higher than the vapor pressure in vapor space 19 in order that the displacement of the liquid contents 12 can be effected.

A substantial amount of residual vapor, such as anhydrous ammonia vapor, remains in the tank car 11 and, as mentioned above, this residual vapor represents valuable material, the recovery of which is desirable. To effect the recovery of the residual vapor in tank car 11, a conduit 25 having a valve 28 therein, extends through the top of tank car 11 and into the vapor space now generally occupying the whole of the tank car 11. The other end of conduit 25 extends into an absorber generally indicated 29 and has an extension 31 extending into the absorber 29. The extension 31 may be perforated to permit the escape of vapor into the liquid 32 contained in the absorber 29. A conduit 33 supplies liquid refrigerating medium from the liquid contents 18 of storage receiver 17 to a closed system 36 which is in indirect heat-exchange relationship with the liquid contents 32 of absorber 29. The refrigerating medium in the vapor phase leaves the closed system 36 by means of conduit 37 having a valve 38 therein and is conveyed by conduit 40 to compressor 23, wherein it is compressed and flows through outlet line 24 to conduit 39 having a valve 41 therein. The compressed vapor medium in line 39 flows into a cooling unit 42 where it is reliquefied and is thence returned to the liquid contents 18 of storage receiver 17. Alternatively, the refrigerating medium in line 39 can be directly returned to the storage receiver 17 by dispensing with cooling unit 42 and utilizing the liquid contents 18 as a heat sink.

A suitable solvent, such as water, is supplied to the absorber 29 by conduit 43. The resulting solution 32 in absorber 29 is removed by line 44 having a valve 46 therein to a second storage receiver 47.

This invention comprehends the utilization of a dual-purpose compressor 23. This compressor 23 is utilized for compressing the vapor supplied to it from the vapor space 19 in storage receiver 17 by conduits 21 and 40. The resulting compressed vapor is then used for displacing the liquid contents 12 in the tank car 11. Subsequently, the compressor 23 is utilized for compressing the vapor supplied to it by conduits 37 and 40 resulting from the indirect heat exchange of the refrigerating medium in the closed system 36 with the liquid contents 32 of the absorber. The compressor 23 may be of any well-known type.

In order to convey the liquid refrigerating medium from the storage receiver 17 to the closed system 36 through conduit 33, the hydrostatic head of the liquid contents 18 may be relied upon or, alternatively, a small pump can be inserted in conduit 33.

The liquid refrigerating medium supplied by line 33 to the closed system 36 expands to vapor phase as it flows through the closed system 36, heat for this purpose being drawn from the liquid contents 32. Alternatively, this expansion can be effected by causing the liquid refrigerating medium in line 33 to flow through an expansion valve 34, such as the needle-type. By means of this indirect heat exchange system, the heat generated by the solution of the residual vapor in the liquid contents 32 of the absorber 29 is dissipated and to this end, the refrigerative capacity of the stored liquid contents 18 is utilized.

Another particular advantage of my invention is the fact that existing, commonly employed unloading facilities can be readily modified according to the practice of my invention with a minimum of expense. For example, a dealer in liquefied anhydrous ammonia need only to obtain a suitable absorber and relatively inexpensive appurtenances in order to economically effect the recovery of residual vapors in the tank car, which vapors heretofore have not been recovered for want of a suitable method and apparatus to effect the same.

*Example*

As an example, assume a tank car having a capacity of 11,000 gallons. After the liquid anhydrous ammonia has all been discharged to storage, the residual anhydrous ammonia vapor remaining in the tank car has a vapor pressure of about 130 p. s. i. g. and initially there is 38.1 pound mols of residual vapor in the tank car. The residual vapor is discharged from the tank car and passed into an absorber unit where it is dissolved in water so as to produce 30 percent aqua ammonia. To this end the refrigerative capacity of the stored liquid anhydrous ammonia is employed. The final vapor pressure of the relatively small amount of anhydrous ammonia remaining in the tank car will be about 8 p. s. i. g., the vapor temperature will be abou 60° F., and the amount of vapor remaining will be about 6.0 pound mols. The amount of anhydrous ammonia vapor thus removed from the tank car is 32.1 pound mols or 546 pounds. This removed vapor is recovered in the form of 1820 pounds of 30 percent aqua ammonia. Assuming that a 5 H. P. compressor is available to recompress the anhydrous ammonia vapor resulting from the absorption of the aqua ammonia heat of reaction by the refrigerating liquid anhydrous ammonia and that 10 square feet of heat exchange surface is available in the absorber device, $\Delta T$ of 50° F., and a heat transfer coefficient of 70 B. t. u./hr. ° F. ft.$^2$, the time for removing and recovering 546 pounds of residual anhydrous ammonia vapor will be about 5 hours.

The above example illustrates my invention as it could be practiced by a dealer in ammonia having limited handling facilities. Of course, where it is practiced on a larger scale and where a larger compressor and heat exchange unit are available, the time required for removing and recovering residual vapors from a tank car or the like will accordingly be less than 5 hours.

Various modifications of my invention will become apparent to those skilled in the art, without departing from the scope and spirit of my invention, and it is to be understood that the above discussion, examples, and accompanying drawing are merely illustrative of a practical application of my invention and it is not to be unduly limited thereto.

I claim:

1. A method for removing the contents of a container containing a highly volatile liquid and its vapor, which comprises transferring said liquid from said container to a storage zone by displacing said liquid with a portion of its vapor from said storage zone, transferring the residual vapor remaining in said container to an absorption zone containing a solvent for said vapor, dissolving said residual vapor in said solvent, and cooling said absorption zone by employing the refrigerative capacity of said liquid stored in said storage zone.

2. A method for removing the contents of a container containing a highly volatile liquid and its vapor, which comprises transferring said liquid from said container to a storage zone, compressing a portion of the vapor resulting in said storage zone, transferring the resulting compressed vapor to said container so as to displace said liquid therein and effect its transfer, allowing the residual vapor remaining in said container after the transfer of said liquid to be transferred to an absorption zone containing a solvent for said residual vapor, dissolving said residual vapors in said solvent, cooling said absorption zone by indirectly heat exchanging it with said liquid stored in said storage zone, compressing and reliquefying the vapors resulting from the indirect heat exchange of said stored liquid with said absorption zone and transferring the resulting reliquefied vapors to said storage zone.

3. A method for removing the contents of a container containing a highly volatile liquid and its vapors, which comprises transferring said liquid from said container to a storage zone, removing the resulting vapor from said storage zone and compressing the same in a compression zone, transferring the resulting compressed vapor to said container so as to displace said liquid therein and effect its transfer, allowing the residual vapor remaining in said container after transfer of said liquid to be transferred to an absorption zone by reason of its vapor pressure, dissolving the resulting transferred residual vapor in a solvent therefor in said absorption zone with a resulting production of heat, dissipating said heat by indirectly heat exchanging said absorption zone with said liquid removed from said storage zone, transferring the vapors resulting from the indirect heat exchange of said removed liquid with said absorption zone to said compression zone wherein the resulting transferred vapors are compressed, reliquefying the resulting compressed vapors, and transferring the resulting reliquefied vapors to said storage zone.

4. The method according to claim 3 wherein said highly volatile liquid is liquefied anhydrous ammonia and said solvent is water.

5. In a system for the removal of a highly volatile liquid and its vapors from a container comprising conduit means for transferring said liquid to a storage receiver, a compressor, conduit means for transferring vapor from said receiver to said compressor and thence to said container, an absorber, a conduit for the residual vapors in said container to said absorber, an indirect heat exchanger unit within said absorber, a conduit to conduct said liquid in said storage receiver to said unit, conduit means connected to said unit to conduct vapor from said unit to said compressor, and conduit means connecting said compressor with said storage receiver.

6. In a system for the removal of a highly volatile liquid and its vapor from a closed container comprising a conduit passing through said container and terminating at one end adjacent the bottom of said container, said conduit connected at its other end to a storage receiver, a compressor, conduit means for transferring vapor from a vapor space in said storage receiver to said compressor and conduct the resulting compressed vapor to said container, conduit means for transferring residual vapor in said container to an absorber containing a solvent for said residual vapors, conduit means for conducting liquid from said storage receiver to an indirect heat exchange unit in said absorber, conduit means to conduct vapor from said unit to said compressor, and conduit means to conduct compressed vapor from said compressor to said storage receiver.

7. The system according to claim 6 wherein said conduit means for conducting liquid from said storage receiver to said indirect heat exchange unit is provided with an expansion valve, and said conduit means to conduct compressed vapor from said storage receiver is provided with cooling means.

References Cited in the file of this patent

UNITED STATES PATENTS

| | | |
|---|---|---|
| 1,778,322 | Hull | Oct. 14, 1930 |
| 1,878,174 | Oberfell | Sept. 20, 1932 |
| 2,502,525 | Krugler | Apr. 4, 1950 |
| 2,535,364 | Lee | Dec. 26, 1950 |

FOREIGN PATENTS

| | | |
|---|---|---|
| 1,112,621 | France | Nov. 16, 1955 |

UNITED STATES PATENT OFFICE
CERTIFICATE OF CORRECTION

Patent No. 2,859,594                                       November 11, 1958

Alvin W. Peck

It is hereby certified that error appears in the printed specification of the above numbered patent requiring correction and that the said Letters Patent should read as corrected below.

Column 5, line 17, after "for" insert -- conducting --.

Signed and sealed this 15th day of September 1959.

(SEAL)
Attest:

KARL H. AXLINE                                                  ROBERT C. WATSON
Attesting Officer                                          Commissioner of Patents